(12) United States Patent
Lee et al.

(10) Patent No.: US 11,772,505 B2
(45) Date of Patent: Oct. 3, 2023

(54) SYSTEM AND METHOD FOR CHARGING USING MOTOR DRIVING SYSTEM

(71) Applicants: HYUNDAI MOTOR COMPANY, Seoul (KR); KIA MOTORS CORPORATION, Seoul (KR)

(72) Inventors: Seong Min Lee, Hwaseong-si (KR); Sang Cheol Shin, Suwon-si (KR); Young Seul Lim, Seoul (KR); Ki Jong Lee, Osan-si (KR); Je Hwan Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 527 days.

(21) Appl. No.: 16/816,658

(22) Filed: Mar. 12, 2020

(65) Prior Publication Data
US 2021/0044135 A1    Feb. 11, 2021

(30) Foreign Application Priority Data
Aug. 6, 2019    (KR) .................. 10-2019-0095384

(51) Int. Cl.
*B60L 53/24*    (2019.01)
*H02J 7/14*    (2006.01)
(Continued)

(52) U.S. Cl.
CPC .............. *B60L 53/24* (2019.02); *B60L 50/52* (2019.02); *B60L 53/20* (2019.02); *B60L 53/22* (2019.02); *H02J 7/14* (2013.01)

(58) Field of Classification Search
CPC ....................................................... B60L 53/24
(Continued)

(56) References Cited

U.S. PATENT DOCUMENTS

| | | | | |
|---|---|---|---|---|
| 5,500,579 A | * | 3/1996 | Kim ...................... | B60L 53/11 320/109 |
| 5,504,414 A | * | 4/1996 | Kinoshita ................ | B60L 7/14 320/109 |

(Continued)

FOREIGN PATENT DOCUMENTS

| KR | 10-2019-0119778 A | 10/2019 |
|---|---|---|
| KR | 10-2020-0068175 A | 6/2020 |
| KR | 10-2020-0075937 A | 6/2020 |

*Primary Examiner* — Jerry D Robbins
(74) *Attorney, Agent, or Firm* — LEMPIA SUMMERFIELD KATZ LLC

(57) ABSTRACT

A charging system using a motor driving system includes: a battery, an inverter having connection terminals including a positive terminal and a negative terminal, and a plurality of motor connection terminals, and a plurality of switching elements forming an electrical connection relationship between the DC connection terminals and the connection terminals; a motor including a plurality of coils that has first ends respectively connected to the motor connection terminals, and second ends connected to each other to form a neutral point; a plurality of switches to form an electrical connection between the battery and the inverter, and to form an electrical connection between the battery and the neutral point, and to connect or disconnect a charging current to the DC connection terminals; and a controller controlling operation of the switches and the inverter based on a magnitude of a charging voltage.

17 Claims, 2 Drawing Sheets

Figure 1:
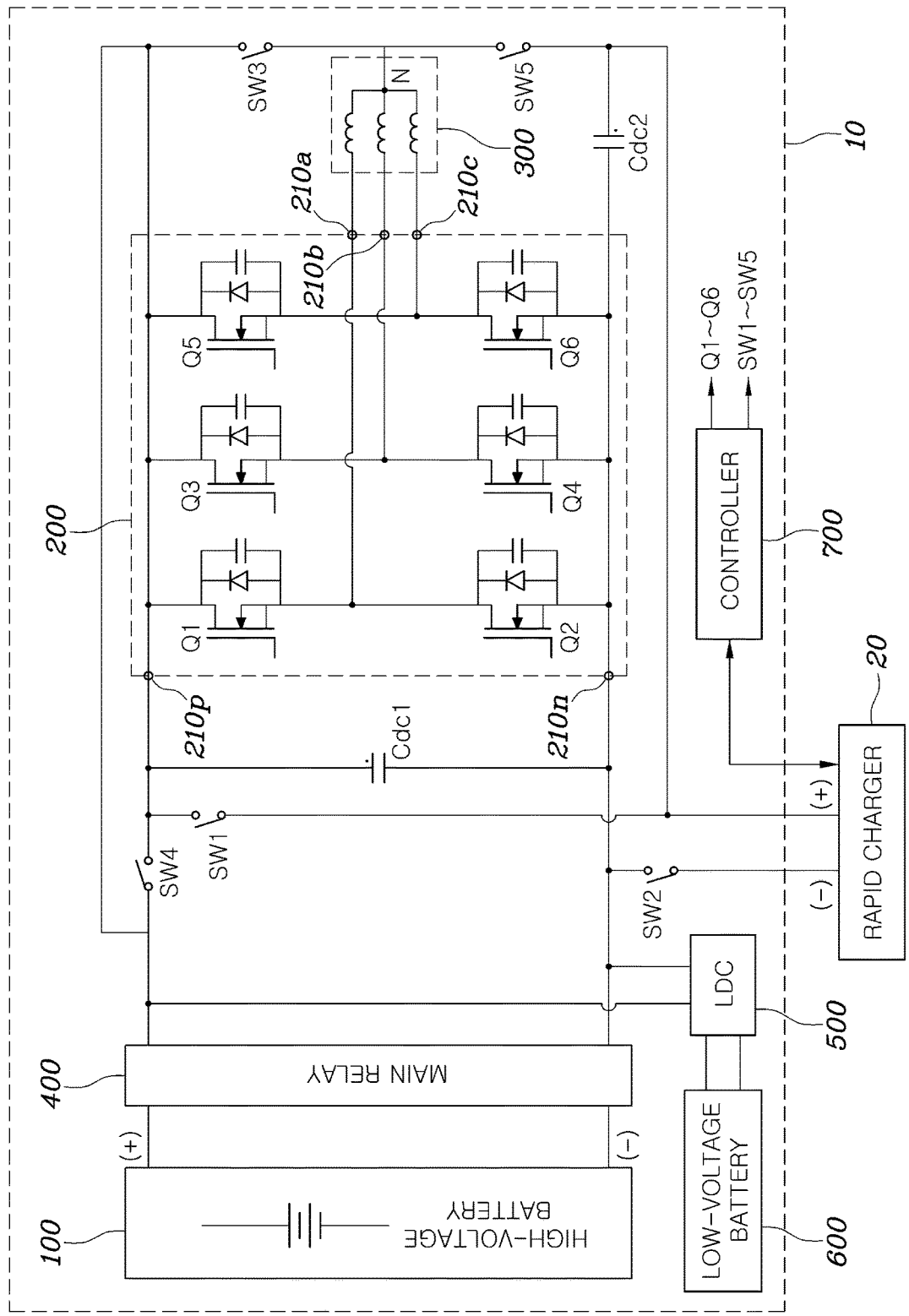

(51) Int. Cl.
*B60L 53/20* (2019.01)
*B60L 50/52* (2019.01)
*B60L 53/22* (2019.01)

(58) Field of Classification Search
USPC ........................................................ 320/107
See application file for complete search history.

(56) References Cited

U.S. PATENT DOCUMENTS

| | | | |
|---|---|---|---|
| 5,629,603 A * | 5/1997 | Kinoshita | B60L 50/51 |
| | | | 320/109 |
| 10,562,404 B1 * | 2/2020 | Khaligh | H02M 1/44 |
| 2011/0050173 A1 * | 3/2011 | King | H02J 1/10 |
| | | | 320/128 |
| 2011/0148353 A1 * | 6/2011 | King | B60L 50/51 |
| | | | 320/109 |
| 2012/0181975 A1 * | 7/2012 | Loudot | B60L 53/20 |
| | | | 320/104 |
| 2019/0168628 A1 * | 6/2019 | Pfeilschifter | B60L 53/14 |
| 2019/0255953 A1 * | 8/2019 | Conlon | H02J 7/00036 |
| 2020/0298722 A1 * | 9/2020 | Smolenaers | B60L 53/53 |

* cited by examiner

SYSTEM AND METHOD FOR CHARGING USING MOTOR DRIVING SYSTEM

CROSS REFERENCE TO RELATED APPLICATION

This application claims priority to and the benefit of Korean Patent Application No. 10-2019-0095384, filed Aug. 6, 2019, the entire contents of which are incorporated herein by reference.

FIELD

The present disclosure relates to a charging power supply system using a motor driving system and, more particularly, to a system and method for charging a battery using a motor driving system.

BACKGROUND

The statements in this section merely provide background information related to the present disclosure and may not constitute prior art.

In general, an electric vehicle or a plug-in hybrid vehicle can charge a battery therein using power that is provided from an external charging facility, and can generate power for the vehicle by driving a motor using the electrical energy stored in the charged battery.

As a method of charging a battery in a vehicle, there are a slow charging method that relatively slowly charges a battery using a vehicle-mounted charger that converts AC charging power provided from the outside into DC charging power having magnitude suitable for charging a battery, and a rapid charging method that relatively quickly charges a battery by providing DC charging power from the outside directly to a battery.

Since the rapid charging method applies DC charging power from the outside directly to a battery, the voltage of the DC charging power from the outside should be provided as a voltage having appropriate magnitude that can charge a battery. As various types of eco-friendly vehicles have been developed, the range of voltages of batteries adapted for the various eco-friendly vehicles becomes wide. However, it is difficult to change the infrastructure to supply DC charging power to satisfy such wide range of voltages of batteries, and thus a converter for changing a charging voltage to have magnitude that can charge batteries is additionally desired, which causes additional costs or increases the manufacturing costs.

Further, even if it is possible to adjust the magnitude of a voltage through an external rapid charging facility instead of a converter, the magnitude of a current that is provided from the rapid charging facility is constant regardless of a voltage, so when a charging voltage is adjusted lower than the maximum supply power that the rapid charging facility can provide, the charging power that is provided from the rapid charging facility decreases. For example, as for the rapid charging facility that provides a charging current of 250 A, the charging power decrease to a half when providing a charging voltage of 400V in comparison to when providing a charging voltage of 800V.

SUMMARY

The present disclosure provides a system and method for charging a battery using a motor driving system, the system and method being able to cope with various battery voltages and further improves a battery charging speed using maximum charging power that an external charging facility can provide, by converting a DC charging voltage from an outside into a voltage having magnitude suitable for charging a battery using the motor driving system that is provided for driving a motor.

In one form of the present disclosure, a charging system using a motor driving system may include: a battery; an inverter including: DC connection terminals including a positive terminal and a negative terminal, and a plurality of motor connection terminals, and a plurality of switching elements forming an electrical connection relationship between the DC connection terminals and the plurality of motor connection terminals; a motor including a plurality of coils having: first ends respectively connected to the plurality of motor connection terminals, and second ends connected to each other to form a neutral point; a plurality of switches configured to: form an electrical connection between the battery and the inverter, form an electrical connection between the battery and the neutral point, and connect or disconnect a charging current to the DC connection terminals; and a controller controlling operation of the plurality of switches and the inverter based on a magnitude of a charging voltage.

When the charging voltage is larger than a predetermined reference value in comparison to a voltage of the battery, the controller may control states of the plurality of switches such that the charging voltage is applied to the DC connection terminals and the neutral point is connected to the battery, and may control the plurality of switching elements such that a circuit formed by the plurality of switching elements in the inverter and the plurality of coils operates as a step-down converter.

The controller may control duty of a switching element, among the plurality of switching elements, connected to the positive terminal of the DC connection terminals such that the charging voltage applied to the DC connection terminals is bucked and formed at the neutral point.

When the charging voltage is smaller than a predetermined reference value in comparison to a voltage of the battery, the controller may control states of the plurality of switches such that the charging voltage is applied to the neutral point and the DC connection terminals are connected to the battery, and may control the plurality of switching elements such that a circuit formed by the plurality of switches in the inverter and the plurality of coils operates as a step-up converter.

The controller may control duty of a switching element, among the plurality of switching elements, connected to the negative terminal of the DC connection terminals such that the charging voltage applied to the DC connection terminals is boosted and formed at the DC connection terminals.

When the charging voltage has a magnitude suitable for charging the battery, the controller may control states of the plurality of switches such that the charging voltage is applied directly to the battery.

The plurality of switches may include: a first switch connected between a positive terminal of an external charger, which provides the charging voltage, and the positive terminal of the inverter; a second switch connected between a negative terminal of the external charger and the negative terminal of the inverter; a third switch connected between the neutral point of the motor and a positive terminal of the battery; and a fourth switch connected between the positive terminal of the inverter and the positive terminal of the battery.

When the charging voltage is larger than a predetermined value in comparison to a voltage of the battery, the controller may short the first switch, the second switch, and the third switch, and may open the fourth switch.

The controller may control duty of a switching element, among the plurality of switching elements, connected to the positive terminal of the DC connection terminals such that the charging voltage applied to the DC connection terminals is bucked and formed at the neutral point.

When the charging voltage has a magnitude suitable for charging the battery, the controller may short the first switch, the second switch, and the fourth switch, and may open the third switch.

The system for charging using a motor driving system may further include a fifth switch connected between the positive terminal of the external charger and the neutral point.

When the charging voltage is smaller than a predetermined value in comparison to a voltage of the battery, the controller may short the second switch, the fourth switch, and the fifth switch, and may open the first switch and the third switch.

The controller may control duty of a switching element, among the plurality of switching elements, connected to the negative terminal of the DC connection terminals such that the charging voltage applied to the DC connection terminals is boosted and formed at the DC connection terminals.

In another form of the present disclosure, a charging system using a motor driving system may include: an inverter converting DC power of a battery into AC power having a plurality of phases when a vehicle is driven; and a motor having a plurality of coils respectively receiving the converted AC power by the inverter. The charging system further includes a controller to determine a charging mode among first, second and third charging modes based on a magnitude of a charging voltage. In the first charging mode, the charging voltage from an outside directly supplies to the battery, in the second charging mode, a bucked voltage supplies to the battery through a neutral point where the plurality of coils connected to each other by applying the charging voltage to DC connection terminals of the inverter such that switching elements in the inverter and the coils operate as a step-down converter, and in the third charging mode, a boosted voltage supplies to the battery through the DC connection terminals of the inverter by applying the charging voltage to the neutral point such that the coils and the inverter operate as a step-up converter.

In other form of the present disclosure, a method of charging a battery is provided using a motor driving system which includes a motor having a plurality of coils, a plurality of switches, a controller, and an inverter, where the inverter includes DC connection terminals, a plurality of motor connection terminals, and a plurality of switching elements. The method includes: determining, by a controller, a charging mode by comparing a magnitude of the charging voltage with a voltage of the battery; and controlling, by the controller, states of the plurality of switches such that the charging voltage is applied to the DC connection terminals and the neutral point formed by ends of the plurality of coils is connected to the battery, and controlling, by the controller when the charging voltage is larger than a predetermined reference value in comparison to the voltage of the battery, the plurality of switching elements such that a circuit formed by the plurality of switching elements and the coils operates as a step-down converter.

The method may further include controlling, by the controller, states of the plurality of switches such that the charging voltage is applied directly to the battery when the charging voltage has a magnitude suitable for charging the battery.

The method may further include: controlling, by the controller, states of the plurality of switching elements such that the charging voltage is applied to the neutral point and the DC connection terminals are connected to the battery, and controlling, by the controller when the charging voltage is smaller than a predetermined reference value in comparison to a voltage of the battery, the plurality of switching elements such that a circuit formed by the plurality of switches and the coils operates as a step-up converter.

According to the system and method for charging using a motor driving system, it is possible to convert a charging voltage such that a voltage having desired magnitude is provide to the battery by using a circuit structure that is formed by the switching elements in the inverter and the coils of the motor without an additional converter even if the magnitude of a charging voltage supplied for rapid charging from the outside is not magnitude suitable for charging the battery. Accordingly, it is possible to reduce cost due to addition of a device and suppress an increase in manufacturing cost.

In particular, according to the system and method for charging using a motor driving system, when the circuit formed by the switching elements in the inverter and the coils of the motor is used as a step-down converter, it is possible to increase the charging current, which is provided at the maximum voltage of the external rapid charger, by the reciprocal number of the duty of the converter and then supply the charging current to the battery. Accordingly, it is possible to remarkably increase the charging speed and reduce the charging time, as compared with when a charging current is provided at a low voltage from the rapid charger.

The effects of the present disclosure are not limited to the effects described above and other effects can be clearly understood by those skilled in the art from the following description.

Further areas of applicability will become apparent from the description provided herein. It should be understood that the description and specific examples are intended for purposes of illustration only and are not intended to limit the scope of the present disclosure.

DRAWINGS

Figure 2:
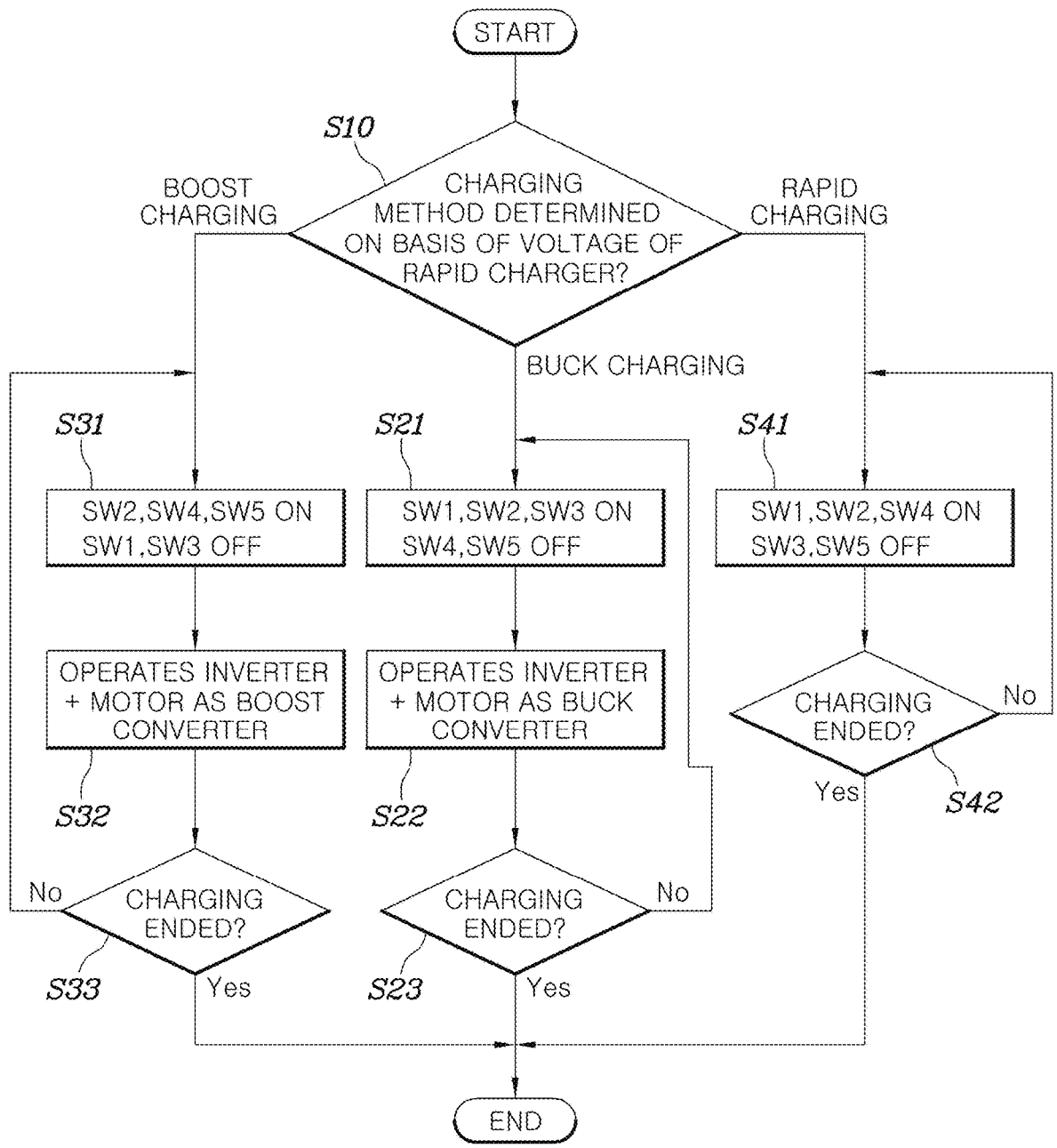

In order that the disclosure may be well understood, there will now be described various forms thereof, given by way of example, reference being made to the accompanying drawings, in which:

FIG. 1 is a system circuit diagram of a charging system using a motor driving system according to one form of the present disclosure; and FIG. 2 is a flowchart of a charging system using a motor driving system according to another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A system and method for charging using a motor driving system according to various forms is described hereafter in detail with reference to the accompanying drawings.

FIG. 1 is a system circuit diagram of a charging system using a motor driving system according to one form of the present disclosure.

Referring to FIG. 1, a charging system 10 is a system that generates and provides a voltage having a magnitude, which can charge a battery 100 that is an energy storage device, through a system provided to drive a motor 300 on the basis of a DC charging voltage provided from the outside of a vehicle, or that provides a DC charging voltage from the outside directly to the battery 100.

In general, the system for driving the motor 300 may include the battery 100 that is an energy storage device storing power for driving the motor 300, and an inverter 200 that converts the DC power stored in the battery 100 into 3-phase AC and provides the 3-phase AC to the motor 300. The inverter 200 has DC connection terminals having a positive (+) terminal 210p and a negative (−) terminal 210n respectively connected to both ends of the battery 100, and three legs connected to each other in parallel between the Dc connection terminals. Two switching elements (two of Q1 to Q6) are connected in series to each of the legs and connection nodes of the two switching elements are a plurality of motor connection terminals 210a, 210b, and 210c connected to the phases of the motor 300, respectively.

In order to drive the motor, pulse width modulation control of the switching elements Q1-Q6 in the inverter 200 may be performed to be able to provide a current to the motor 300 by a current instruction corresponding to the torque of the motor 300 that is intended to be obtained by driving the motor 300.

According to various forms of the present disclosure, unlike when the motor is driven, as described above, it is possible to generate a DC voltage having desired magnitude at the neutral point N of the motor 300 and then apply the DC voltage to the battery 100 by applying an external DC charging current to the DC connection terminals 210p and 210n of the inverter and controlling the switching elements Q1-Q6 of the inverter 200. Alternatively, it is possible to generate a DC voltage having desired magnitude at the DC connection terminal of the inverter 200 and then provide the DC voltage to the battery 100 by applying external DC charging power to the neutral point N of the motor 300 and controlling the switching elements Q1-Q6 of the inverter 200. Further, when the voltage that is provided from an external charging facility (a rapid charger 20 providing a DC charging voltage) has magnitude suitable for charging the battery 100, the external DC charging voltage may be applied directly to the battery 100 not through the inverter 200 or the motor 300.

In order to achieve the features described above, a charging system using a motor driving system according to one form of the present disclosure may include: a battery 100; an inverter 200 having DC connection terminals, which include a positive (+) terminal 210p and a negative (−) terminal 210n, and a plurality of motor connection terminals 210a, 210b, and 210c, and including a plurality of switching elements Q1-Q6 that forms an electrical connection relationship between the DC connection terminals 210p and 201n and the plurality of motor connection terminals 210a, 210b, and 210c; a motor 300 including a plurality of coils that has first ends respectively connected to the plurality of motor connection terminals 210a, 210b, and 210c and second ends connected to each other to form a neutral point N; a plurality of switches SW1~SW5 determining an electrical connection relationship between the battery 100 and the inverter and an electrical connection relationship between the battery 100 and the neutral point N, and connecting or disconnection a charging current that is supplied from the outside to the DC connection terminals 210p and 210n; and a controller 700 controlling operation of the plurality of switches SW1~SW5 and the inverter 200 in accordance with the magnitude of the charging voltage.

The battery 100, which is a component that is the target of charging, can be charged with DC charging power provided from the external charger 20 in a charging mode. In general, the battery 100 is an energy storage device for storing driving power that is provided to the motor 300 that is driven when a vehicle is driven.

The inverter 200 may include the DC connection terminals having the positive terminal 210p and the negative terminal 210p and the plurality of switching elements Q1-Q6 having the plurality of motor connection terminals 210a, 210b, and 210c and forming an electrical connection relationship between the DC connection terminals 210p and 210n and the plurality of motor connection terminals 210a, 210b, and 210c. In general, when a vehicle is driven, the inverter 200 can convert DC power stored in the battery 100 into AC power having a plurality of phases and provide the power having a plurality of phases to the phases of the motor 300, respectively.

As described above, the connection nodes of the two switching elements (Q1, Q2/Q3, Q4/Q5, Q6) respectively included the legs of the motor may be connected to coils respectively corresponding to the phases of the motor 300 through the motor connection terminals 210a, 210b, and 210c. Accordingly, two switching elements include one leg of the inverter 200 and one coil in the motor 300 of which a first end is connected to the connection node of the switching elements can implement the topology of a step-down DC-DC converter or a step-up DC-DC converter, depending on the direction of energy flow.

That is, when energy flows from the DC connection terminals 210p and 210n of the inverter 200 to the neutral point N of the motor 300, the switching elements of the inverter 200 and the coils of the motor 300 can implement a step-down DC-DC converter that controls the duty of the switching elements Q1, Q3, and Q5 having a top phase and connected to the positive terminal 210p. Since the three-phase inverter 200 has a total of three legs, a structure, in which three step-down DC-DC converters are connected in parallel, is formed between the DC connection terminals of the inverter 200 and the neutral point N of the motor 300.

Further, when energy flows from neutral point N of the motor 300 to the DC connection terminals 210p and 210n of the inverter 200, the switching elements of the inverter 200 and the coils of the motor 300 can implement a step-up DC-DC converter that controls the duty of the switching elements Q2, Q4, and Q6 having a bottom phase and connected to the negative terminal 210n. Since the three-phase inverter 200 has a total of three legs, a structure, in which three step-up DC-DC converters are connected in parallel, is formed between the DC connection terminals of the inverter 200 and the neutral point N of the motor 300.

In order to form a step-down converter and a step-up converter, as described above, and apply a voltage having suitable magnitude to the battery 100 in charging, the plurality of switches SW1~SW5 may be provided to form an appropriate electrical connection path.

The first switch SW1 and the second switch SW2 may be connected between the positive terminal and the negative terminal of the external rapid charger 20 and the positive terminal 210p and the negative terminal 210n of the inverter 200. The third switch SW3 may be connected between the neutral point N of the motor 300 and the positive terminal of the battery 100 and the fourth switch SW4 may be connected between the positive terminal 210p of the inverter 200 and the positive terminal of the battery 100. When the connection state of the first to fourth switches SW1~SW4 is appropriately adjusted, it is possible to buck and then provide the charging voltage of the rapid charger 20 to the battery or it is possible to provide the charging voltage of the rapid charger 20 without a change to the battery 100.

In order to boost and then provide the charging voltage of the external rapid charger 20, the fifth switch SW5 connected between the positive terminal of the rapid charger 20 and the neutral point N of the motor 300 may be further provided.

Various switching devices (a semiconductor switch, a relay, etc.) well known in the art may be used as the first to fifth switches SW1~SW5.

The controller 700 adjusts the connection state of the first to fifth switches SW1~SW5 on the basis of the magnitude of the charging voltage provided from the rapid charger 20 and controls the switching elements Q1-Q6 in the inverter 200 in accordance with the connection state such that a voltage having appropriate magnitude can be applied to the battery 100. Various operations and effects of the present disclosure that are achieved by the controller 700 will be more clearly understood through the following description about the method of charging using a motor driving system according to one form of the present disclosure.

In FIG. 1, reference numeral '400' indicates a main relay that determines the connection state of the battery 100 and the other devices and the main relay can be shorted when the engine is started up or charged. Further, reference numeral '500' indicates a lower voltage DC-DC converter that converts the high voltage of the battery 100 into a low voltage corresponding to the power for electronic devices of the vehicle. Further, reference numeral '600' indicates a low-voltage battery that supplies the power for the electronic devices and the low-voltage battery can be charged with the power that is provided from the LDC 500. Reference numeral 'Cdc1' indicates a capacitor for generating a high voltage at a high-voltage DC link terminal and reference numeral 'Cdc2' indicates a capacitor for generating a DC voltage when the charging voltage of the external rapid charger 20 is applied to the neutral point N of the motor 300.

FIG. 2 is a flowchart of a charging system using a motor driving system according to another form of the present disclosure.

Referring to FIG. 2, the charging method uses a charging system such as that shown in FIG. 1. In one form, when charging is started, the controller 700 can determine a charging method on the basis of the voltage magnitude of the charging power that is provided from an external charging facility (rapid charger) 20 that supplies DC charging power (S10).

In step S10, the controller 700 can be provided with information about the magnitude of the charging voltage, which the rapid charger 20 supplies, through communication with the rapid charger 20.

Further, when the magnitude of the charging voltage that the rapid charger 20 supplies is larger than a predetermined reference value in comparison to the voltage of the battery 100 that is the target of charging, the controller 700 can determine and apply a step-down charging method for bucking the charging voltage that is supplied from the outside for charging.

When the step-down charging method is applied, the controller 700 shorts the first switch SW1 and the second switch SW2 such that the charging voltage of the rapid charger 20 is applied to the DC connection terminals 210p and 210n of the inverter 200, and shorts the third switch SW3 such that the neutral point N of the motor 300 is electrically connected to the positive terminal of the battery 100. Further, the controller 70 opens the fourth switch SW4 and the fifth switch SW5 (S21).

Further, the controller 700 controls the duty of the switching elements Q1, Q3, and Q5, which are connected to the positive terminal 210p of the DC connection terminals, of the switching elements in the inverter 200 such that the circuit formed by the coils of the motor 300 which are connected to the motor connection terminals 210a, 210b, and 210c of the inverter 200 operates as a step-down converter (Buck converter), whereby a voltage obtained by decreasing the magnitude of the charging voltage is formed at the neutral point N of the motor 300 such that a bucked voltage can be supplied to the battery (S22). The magnitude of the voltage that is formed at the neutral point N of the motor 300 can be controlled to have magnitude suitable for charging the battery 100 by appropriately determining the duty of the switching elements Q1, Q3, and Q5.

Controlling a step-down converter has been well known in the arts, so description about a detailed switching technique of a switching element is omitted.

Charging the battery through step-down control can be continued until charging is ended in consideration of the charged state of the battery (S23).

Such step-down control can increase and provide the magnitude of the current that is provided from the external charger 20 that is an external charging facility by the reciprocal number of the duty, so it becomes possible to supply much charging current to the battery 100, as compared with a limited charging current supplied from the rapid charger 20. Accordingly, the charging time can be reduced.

On the other hand, when the magnitude of the charging voltage that the rapid charger 20 supplies is smaller than a predetermined reference value in comparison to the voltage of the battery 100 that is the target of charging, the controller 700 can determine and apply a step-up charging method for boosting the charging voltage that is supplied from the outside for charging.

When the step-up charging method is applied, the controller 700 shorts the second switch SW2 and the fifth switch SW5 such that the charging voltage of the rapid charger 20 is applied to the neutral point N of the motor 300, and shorts the fourth switch SW4 such that the positive terminal 210p of the DC connection terminals of the inverter 200 is electrically connected to the positive terminal of the battery 100. Further, the controller 70 opens the first switch SW1 and the third switch SW3 (S31).

Further, the controller 700 controls the duty of the switching elements Q2, Q4, and Q6, which are connected to the negative terminal 210n of the DC connection terminals, of the switching elements in the inverter 200 such that the circuit formed by the coils of the motor 300 which are connected to the motor connection terminals 210a, 210b, and 210c of the inverter 200 operates as a step-up converter (Boost converter), whereby a voltage obtained by increasing the magnitude of the charging voltage applied to the neutral point N of the motor 300 is formed at DC input terminal of the inverter 200 such that a boosted voltage can be supplied to the battery (S32). The magnitude of the voltage that is formed at the neutral point N of the motor 300 can be controlled to have magnitude suitable for charging the battery 100 by appropriately determining the duty of the switching elements Q2, Q4, and Q6.

Controlling a step-up converter has been well known in the arts, so description about a detailed switching technique of a switching element is omitted.

Charging the battery through step-up control can be continued until charging is ended in consideration of the charged state of the battery (S33).

On the other hand, in step S10, when the charging voltage that the rapid charger 20 supplies is a voltage having magnitude suitable for charging the battery 100 that is the target of charging, the controller 700 shorts the first switch SW1, the second switch SW2, and the fourth switch SW4 and opens the third switch SW3 and the fifth switch SW5 such that the charging voltage of the rapid charger 20 is applied directly to the battery 100 (S41).

Charging the battery by directly applying the charging voltage can be continued until charging is ended in consideration of the charged state of the battery (S42).

As described above, the charging system and method using a motor driving system can convert a charging voltage such that a voltage having desired magnitude is provide to the battery by using a circuit structure that is formed by the switching elements Q1~Q6 in the inverter 200 and the coils of the motor 300 without an additional converter even if the magnitude of a DC charging voltage supplied for rapid charging from the outside is not magnitude suitable for charging the battery 100. Accordingly, it is possible to reduce cost due to addition of a device and suppress an increase in manufacturing cost.

In particular, when the circuit formed by the switching elements Q1~Q6 in the inverter 200 and the coils of the motor 300 is used as a step-down converter, it is possible to increase the charging current, which is provided at the maximum voltage of the external rapid charger 20, by the reciprocal number of the duty of the converter and then supply the charging current to the battery 100. Accordingly, it is possible to remarkably increase the charging speed and reduce the charging time, as compared with when a charging current is provided at a low voltage from the rapid charger 20.

Although the present disclosure was described above with reference to specific forms, it would be apparent to those skilled in the art that the present disclosure may be changed and modified in various ways.

What is claimed is:

1. A system for charging a battery using a motor driving system, the system comprising:
    an inverter including:
        DC connection terminals including a positive terminal and a negative terminal,
        a plurality of motor connection terminals, and
        a plurality of switching elements configured to form an electrical connection relationship between the DC connection terminals and the plurality of motor connection terminals;
    a motor including a plurality of coils having: first ends respectively connected to the plurality of motor connection terminals, and second ends connected to each other to form a neutral point;
    a plurality of switches configured to:
        form an electrical connection between the battery and the inverter,
        form an electrical connection between the battery and the neutral point, and
        connect or disconnect a charging current to the DC connection terminals; and
    a controller configured to control operation of the plurality of switches and the inverter based on a magnitude of a charging voltage,
    wherein each of the plurality of motor connection terminals is configured to apply different phases of AC power converted by the inverter to the motor, respectively,
    wherein the different phases of the AC power applied to the motor is configured to charge the battery via a node, which is different from the motor connection terminals and directly connected to the neutral point.

2. The system of claim 1, wherein when the charging voltage is larger than a predetermined reference value in comparison to a voltage of the battery, the controller is configured to:
    control states of the plurality of switches such that the charging voltage is applied to the DC connection terminals and the neutral point is connected to the battery, and
    control the plurality of switching elements such that a circuit formed by the plurality of switching elements in the inverter and the plurality of coils operates as a step-down converter.

3. The system of claim 2, wherein the controller is configured to:
    control a duty of a switching element, among the plurality of switching elements, connected to the positive terminal of the DC connection terminals such that the charging voltage applied to the DC connection terminals is bucked and formed at the neutral point.

4. The system of claim 1, wherein when the charging voltage is smaller than a predetermined reference value in comparison to a voltage of the battery, the controller is configured to:
    control states of the plurality of switches such that the charging voltage is applied to the neutral point and the DC connection terminals are connected to the battery, and
    control the plurality of switching elements such that a circuit formed by the plurality of switches in the inverter and the plurality of coils operates as a step-up converter.

5. The system of claim 4, wherein the controller is configured to:
    control a duty of a switching element, among the plurality of switching elements, connected to the negative terminal of the DC connection terminals such that the charging voltage applied to the DC connection terminals is boosted and formed at the DC connection terminals.

6. The system of claim 1, wherein when the charging voltage has a magnitude suitable for charging the battery, the controller is configured to control states of the plurality of switches such that the charging voltage is applied directly to the battery.

7. The system of claim 1, wherein the plurality of switches includes:
    a first switch connected between a positive terminal of an external charger, which provides the charging voltage, and the positive terminal of the inverter;
    a second switch connected between a negative terminal of the external charger and the negative terminal of the inverter;
    a third switch connected between the neutral point of the motor and a positive terminal of the battery; and
    a fourth switch connected between the positive terminal of the inverter and the positive terminal of the battery.

8. The system of claim 7, wherein when the charging voltage is larger than a predetermined value in comparison to a voltage of the battery, the controller is configured to short the first switch, the second switch, and the third switch, and open the fourth switch.

9. The system of claim 8, wherein the controller is configured to:
control a duty of a switching element, among the plurality of switching elements, connected to the positive terminal of the DC connection terminals such that the charging voltage applied to the DC connection terminals is bucked and formed at the neutral point.

10. The system of claim 7, wherein when the charging voltage has a magnitude suitable for charging the battery, the controller is configured to short the first switch, the second switch, and the fourth switch, and open the third switch.

11. The system of claim 7, further comprising: a fifth switch connected between the positive terminal of the external charger and the neutral point.

12. The system of claim 11, wherein when the charging voltage is smaller than a predetermined value in comparison to a voltage of the battery, the controller is configured to short the second switch, the fourth switch, and the fifth switch, and open the first switch and the third switch.

13. The system of claim 12, wherein the controller is configured to:
control a duty of a switching element, among the plurality of switching elements, connected to the negative terminal of the DC connection terminals such that the charging voltage applied to the DC connection terminals is boosted and formed at the DC connection terminals.

14. A system for charging a battery using a motor driving system, the system comprising:
an inverter converting DC power of a battery into AC power having a plurality of phases when a vehicle is driven;
a motor having a plurality of coils respectively receiving the converted AC power by the inverter; and
a controller configured to determine a charging mode among first, second and third charging modes based on a magnitude of a charging voltage, wherein:
in the first charging mode, the charging voltage from an outside directly supplies to the battery;
in the second charging mode, a bucked voltage supplies to the battery through a neutral point where the plurality of coils connected to each other by applying the charging voltage to DC connection terminals of the inverter such that switching elements in the inverter and the plurality of coils operate as a step-down converter; and
in the third charging mode, a boosted voltage supplies to the battery through the DC connection terminals of the inverter by applying the charging voltage to the neutral point such that the plurality of coils and the inverter operate as a step-up converter,
wherein the inverter includes a plurality of motor connection terminals,
wherein each of the plurality of motor connection terminals is configured to apply each of the plurality of phases to the motor, respectively, and
wherein different phases of the AC power applied to the motor is configured to charge the battery via a node, which is different from the motor connection terminals and directly connected to the neutral point.

15. A method of charging a battery using a motor driving system which includes a motor having a plurality of coils, a plurality of switches, a controller, and an inverter, where the inverter includes DC connection terminals, a plurality of motor connection terminals, and a plurality of switching elements, the method comprising:
determining, by the controller, a charging mode by comparing a magnitude of a charging voltage with a voltage of the battery; and
controlling, by the controller, states of the plurality of switches such that the charging voltage is applied to the DC connection terminals and a neutral point formed by ends of the plurality of coils is connected to the battery; and
controlling, by the controller when the charging voltage is larger than a predetermined reference value in comparison to the voltage of the battery, the plurality of switching elements such that a circuit formed by the plurality of switching elements and the plurality of coils operates as a step-down converter,
wherein each of the plurality of motor connection terminals is configured to apply each of a plurality of phases to the motor, respectively, and
wherein different phases of AC power applied to the motor is configured to charge the battery via a node, which is different from the motor connection terminals and directly connected to the neutral point.

16. The method of claim 15, further comprising:
controlling, by the controller, states of the plurality of switches such that the charging voltage is applied directly to the battery when the charging voltage has a magnitude suitable for charging the battery.

17. The method of claim 15, wherein further comprising:
controlling, by the controller, states of the plurality of switches such that the charging voltage is applied to the neutral point and the DC connection terminals are connected to the battery, and
controlling, by the controller when the charging voltage is smaller than a predetermined reference value in comparison to a voltage of the battery, the plurality of switching elements such that a circuit formed by the plurality of switches and the plurality of coils operates as a step-up converter.

* * * * *